US010853571B2

(12) United States Patent  
Ando

(10) Patent No.: US 10,853,571 B2  
(45) Date of Patent: Dec. 1, 2020

(54) IDENTIFYING INFORMATION ASSIGNMENT SYSTEM, IDENTIFYING INFORMATION ASSIGNMENT METHOD, AND PROGRAM THEREFOR

(71) Applicant: OMRON Corporation, Kyoto (JP)

(72) Inventor: Tanichi Ando, Komaki (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/333,657

(22) PCT Filed: Mar. 13, 2017

(86) PCT No.: PCT/JP2017/010017  
§ 371 (c)(1),  
(2) Date: Mar. 15, 2019

(87) PCT Pub. No.: WO2018/070066  
PCT Pub. Date: Apr. 19, 2018

(65) Prior Publication Data  
US 2019/0258712 A1 Aug. 22, 2019

(30) Foreign Application Priority Data  
Oct. 12, 2016 (JP) .................................. 2016-201201

(51) Int. Cl.  
*G06F 17/16* (2006.01)  
*G10L 17/18* (2013.01)  
(Continued)

(52) U.S. Cl.  
CPC .......... *G06F 40/263* (2020.01); *G06F 40/279* (2020.01); *G06N 20/00* (2019.01)

(58) Field of Classification Search  
CPC .................................................... G06F 16/00  
See application file for complete search history.

(56) References Cited

U.S. PATENT DOCUMENTS 7,496,548 B1 * 2/2009 Ershov .................. G06F 16/334  
706/20  
2016/0293167 A1 * 10/2016 Chen ................ H04N 21/23476  
(Continued)

FOREIGN PATENT DOCUMENTS

JP 2009-64162 A 3/2009  
JP 2012-194609 A 10/2012  
(Continued)

OTHER PUBLICATIONS

Mert Akdere et al, "The Case for Predictive Database Systems: Opportunities and Challenges", 5th Biennial Conference on Innovative Data Systems Research, Jan. 9, 2011: Relevance is indicated in the (translated)ISR/WO dated Jul. 6, 2017.  
(Continued)

*Primary Examiner* — Shreyans A Patel  
(74) *Attorney, Agent, or Firm* — Metolex IP Law Group, PLLC

(57) ABSTRACT

An identifying information assignment system includes: a generating portion configured to generate, for a learning result obtained by attaining a predetermined capability through a predetermined learning process by machine learning, identifying information for identifying the predetermined learning process; and an assignment portion configured to assign the generated identifying information to the learning result.

15 Claims, 14 Drawing Sheets

(51) Int. Cl.
    *G06F 40/263*    (2020.01)
    *G06N 20/00*     (2019.01)
    *G06F 40/279*    (2020.01)

(56) References Cited

U.S. PATENT DOCUMENTS

| | | | | |
|---|---|---|---|---|
| 2017/0339168 | A1* | 11/2017 | Balabine | H04L 63/1416 |
| 2018/0039901 | A1* | 2/2018 | Tanimoto | G06Q 10/04 |

FOREIGN PATENT DOCUMENTS

| | | | |
|---|---|---|---|
| JP | 5816771 | B1 | 11/2015 |
| JP | 2016-103192 | A | 6/2016 |
| WO | 2013/050958 | A1 | 4/2013 |
| WO | 2016/151617 | A1 | 9/2016 |

OTHER PUBLICATIONS

Hui Miao et al., "ModelHub: Lifecycle Management for Deep Learning"(described as "ModelHub: Towards Unified Data and Lifecycle Management for Deep Learning" in the ISR), Jun. 20, 2016, Retrieved from the Internet, URL: https://www.cs.umd.edu/class/spring2016/cmsc396h/downloads/modelhub.pdf (retrieved on Jun. 22, 2017): Relevance is indicated in the (translated)ISR dated Jul. 6, 2017.

Manasi Vartak et al, "Modeldb: A System for Machine Learning Model Management", Proceedings of the Workshop on Human-In-The-Loop Data Analytics, Hilda'16, Jun. 26, 2016, pp. 14.1-14.3: Relevance is indicated in the (translated)ISR dated Jul. 6, 2017.

International Search Report("ISR") of PCT/JP2017/010017 dated Jul. 6, 2017.

Written Opinion("WO") of PCT/JP2017/010017 dated Jul. 6, 2017.

Office Action dated Apr. 17, 2020 in a counterpart Japanese patent application.

* cited by examiner

FIG. 7A

| Basic factor | ID type |
|---|---|
| Capability that is acquired | Acquired capability ID |
| Learning requester | Requester ID |
| Target of learning data | Input data ID |
| Acquisition period | Acquisition period ID |
| Apparatus that uses learning result | Used apparatus ID |
| Target for which learning result is used | Target ID |
| ⋮ | ⋮ |

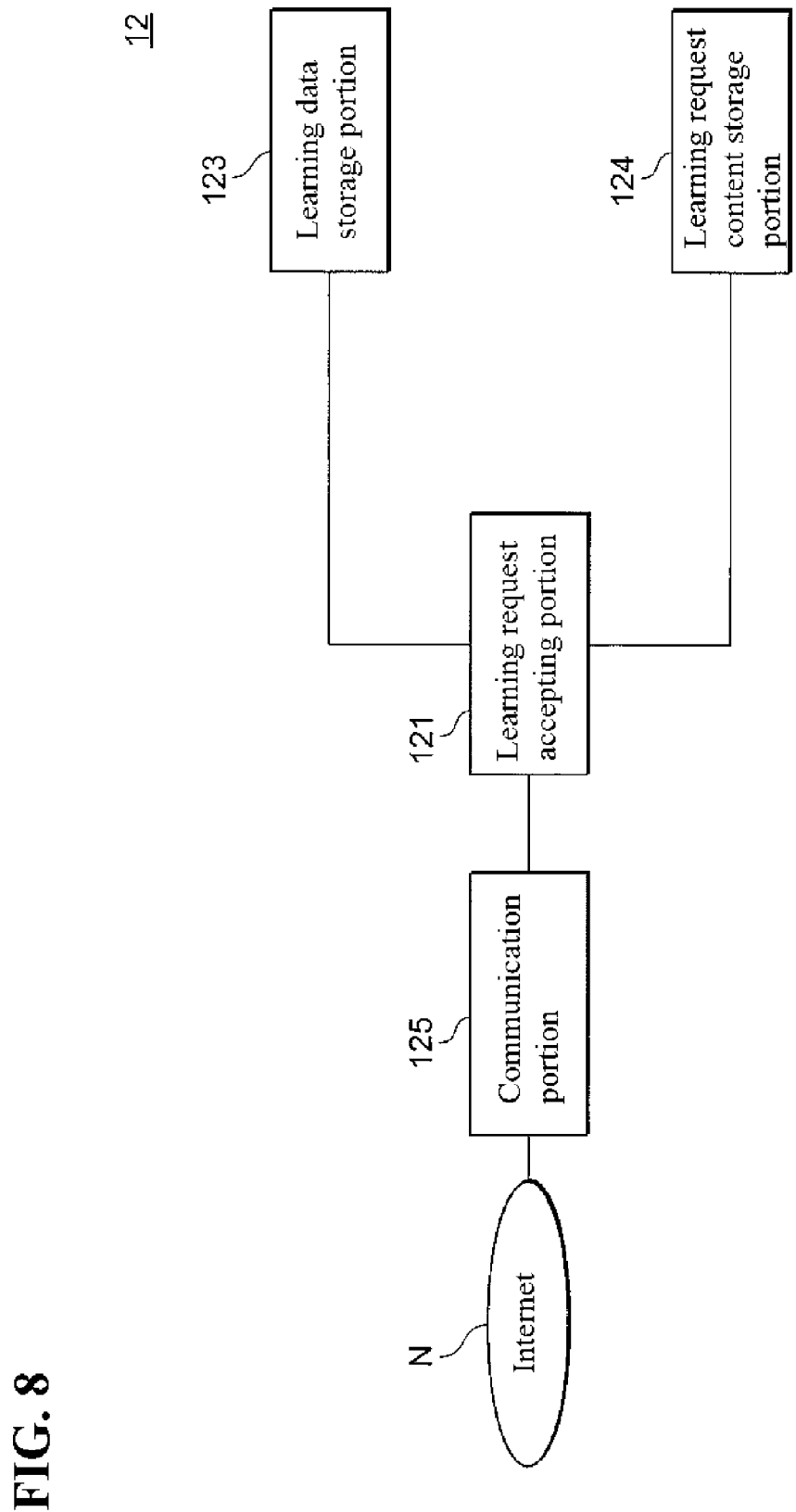

IDENTIFYING INFORMATION ASSIGNMENT SYSTEM, IDENTIFYING INFORMATION ASSIGNMENT METHOD, AND PROGRAM THEREFOR

TECHNICAL FIELD

The present invention relates to an identifying information assignment system, an identifying information assignment method, and a program therefor.

BACKGROUND ART

Conventionally, studies related to artificial intelligence techniques (hereinafter, referred to as "AI techniques") such as neural networks are widely performed (see Patent Document 1, for example). In particular, with the rise of AI techniques called deep learning, for example, the recognition rates of techniques for recognizing targets based on images are rapidly becoming higher in these days, and the recognition rates in classifying images are about to reach the level beyond those by humans. The deep learning techniques are expected to be applied not only to image recognition but also to various other fields such as speech recognition, personal authentication, behavior prediction, summary writing, machine translation, purchase prediction, recommendation, financial derivatives, monitoring, autonomous driving, failure prediction, sensor data analysis, music genre determination, content generation, and security systems.

CITATION LIST

Patent Literature

PTL 1: Japanese Patent No. 5816771

SUMMARY OF INVENTION

Technical Problem

In machine learning such as deep learning, machines can acquire a predetermined capability by performing learning. The capability acquired as a result of the learning can be used by another apparatus via a storage medium or communication means, for example, by converting that capability into data as information related to a neural network structure after the learning and parameters.

However, if the learning apparatus that performs learning is different from the apparatus that uses the capability acquired as a result of the learning, a user of the learning result cannot see what kind of learning data was used and what kind of learning was performed to acquire the learning result. If various types of machine learning are becoming performed in various locations with the future widened use of AI techniques, it will be more difficult to see relationships between machine learning and learning results.

It is an object of the present invention to provide a technique for identifying what kind of learning was performed, for each capability acquired as a result of performing learning by machine learning, and managing the relationship as appropriate.

Solution to Problem

An aspect of the present invention is directed to an identifying information assignment system, including: a generating portion configured to generate, for a learning result obtained by attaining a predetermined capability through a predetermined learning process by machine learning, identifying information for identifying the predetermined learning process; and an assignment portion configured to assign the generated identifying information to the learning result.

With this configuration, a learning process that was performed is identified for a specific learning result, using identifying information. Accordingly, what kind of learning was performed can be identified for each acquired capability, and the relationship can be managed as appropriate.

Furthermore, it is possible that the generating portion is configured to: generate, for a first learning result obtained by attaining a first capability through performing a first learning process, first identifying information for identifying the first learning process within a specific identification range, and generate, for a second learning result obtaining by attaining a second capability through performing a second learning process, second identifying information for identifying the second learning process such that the first learning process and the second learning process are distinguished from each other within the specific identification range.

With this aspect, identifying information is assigned to a learning result, such that identification is possible within a predetermined identification range. Accordingly, identification is not necessary out of the predetermined range, and thus the information amount of identifying information can be reduced.

Furthermore, it is possible that the generating portion is configured to generate the identifying information based on a factor that has an influence on a learning result within the specific identification range, among conditions that are given when the first and second learning is performed. With this aspect, information related to conditions that have no influence on a learning result is excluded from identifying information, and thus the information amount of identifying information can be reduced without lowering the quality in identifying what kind of learning was performed for an acquired capability.

Furthermore, it is possible that learning information that is identifiable by the identifying information includes at least one factor selected from learning apparatus, learning program, learning data, the number of times of learning, time of learning, object of learning, method of learning, learning requester, acquisition source of learning data, and acquisition method of learning data.

Furthermore, it is possible that the identifying information assignment system further includes a learning apparatus configured to perform the machine learning. It is possible that the learning apparatus is configured to perform the machine learning according to learning request information necessary to perform learning of a capability that is to be added to an object apparatus.

Furthermore, it is possible that the identifying information assignment system further includes an influence determining portion configured to extract, from all conditions that may apply to the learning process that is performed by the learning apparatus, those conditions that have an influence on the learning result of the learning process, based on the learning request information. With this aspect, the influence determining portion can extract, from all conditions that may apply to a learning process that is performed by the learning apparatus, those conditions that have an influence on a learning result. Accordingly, the generating portion can exclude information related to conditions that have no influence on a learning result, from identifying information, and thus the information amount of identifying information can be reduced.

Furthermore, it is possible that the generating portion is configured to generate the identifying information, by encrypting, compressing, or listing a data sequence enumerating conditions that have an influence on the learning result. With this aspect, a person who does not have means for decrypting identifying information cannot see conditions that have an influence on a learning result, from the identifying information. As a result, the identifying information assignment system can have a higher level of security.

Furthermore, an aspect of the present invention is directed to an identifying information assignment method for causing a computer to execute: a step of generating, for a learning result obtained by attaining a predetermined capability through a predetermined learning process by machine learning, identifying information for identifying the predetermined learning process; and a step of assigning the generated identifying information to the learning result.

An aspect of the present invention is directed to a program for causing a computer to function as: means for generating, for a learning result obtained by attaining a predetermined capability through a predetermined learning process by machine learning, identifying information for identifying the predetermined learning process; and means for assigning the generated identifying information to the learning result.

Advantageous Effects of Invention

According to the present invention, it is possible to provide a technique for identifying what kind of learning was performed, for each capability acquired as a result of performing learning by machine learning, and managing the relationship as appropriate.

BRIEF DESCRIPTION OF DRAWINGS

FIG. 7A is a table showing an example of basic factors.

FIG. 8 is a block diagram showing an example of the configuration of a learning request accepting apparatus.

DESCRIPTION OF EMBODIMENTS

Figure 1:
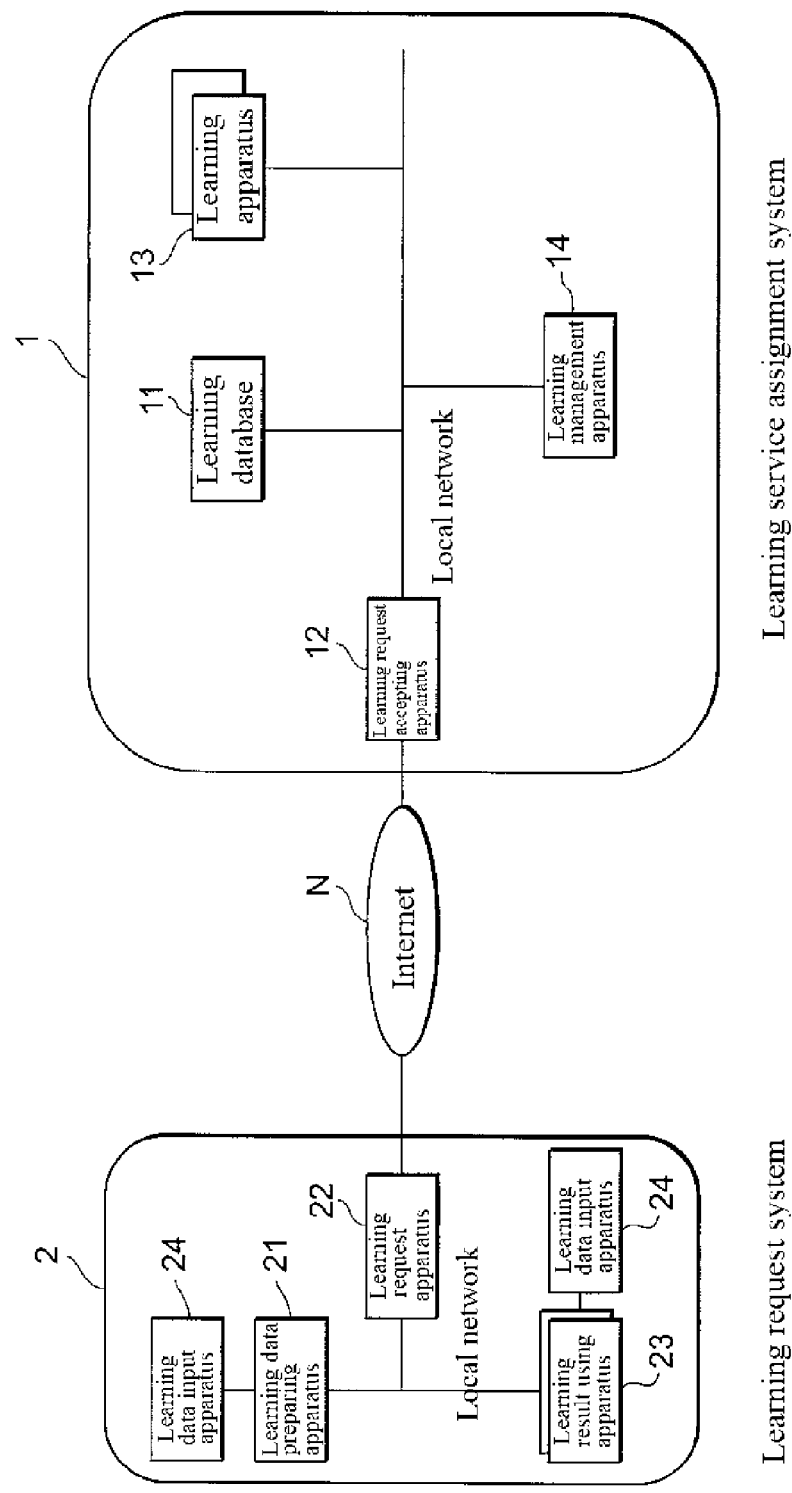
FIG. 1 is a diagram schematically showing the entire system that provides a learning service in this embodiment.

Hereinafter, an embodiment of the present invention will be described in detail with reference to the drawings. Note that the same constituent elements are denoted by the same reference numerals, and a description thereof may not be repeated. The following embodiment is merely illustrative for the sake of explanation, and is not intended to limit the present invention thereto. Various modifications can be made without departing from the gist thereof.

1. System Outline

Hereinafter, the outline of the system in this embodiment will be described with reference to FIGS. 1 and 2. FIG. 1 is a diagram schematically showing the entire system. This system includes a learning service assignment system 1 and a learning request system 2 that are connected to each other via a network N such as the Internet. The configuration of this system is not limited to that shown in the drawing, and, for example, the learning service assignment system 1 and the learning request system 2 may be formed integrally.

As shown in FIG. 1, the learning service assignment system 1 includes a learning database 11, a learning request accepting apparatus 12, one or a plurality of learning apparatuses 13, and a learning management apparatus 14 that are connected to each other via a local network. The learning request system 2 includes a learning data preparing apparatus 21, a learning request apparatus 22, and one or a plurality of learning result using apparatuses 23 that are connected to each other via a local network. The learning data preparing apparatus 21 and the learning result using apparatuses 23 are respectively connected to learning data input apparatuses 24.

Below, a description will be given assuming that the apparatuses included in the learning service assignment system 1 and the learning request system 2 are configured by computers such as PCs (personal computers) or server apparatuses, but there is no limitation this, and, for example, the apparatuses may be realized by any embedded apparatuses using processors. The functions implemented in the apparatuses are not limited to configurations that are realized by software. Any functions contained in the apparatuses may have configurations that are realized by hardware. For example, later-described neural networks 132 and 233 may be configured by electronic circuits such as custom LSIs (large-scale integrations) or FPGAs (field-programmable gate arrays). Furthermore, part of the apparatuses may have configurations that are realized by identifying means using a physical key, a biochemical method such as DNA, or an optical method such as hologram.

Figure 2:
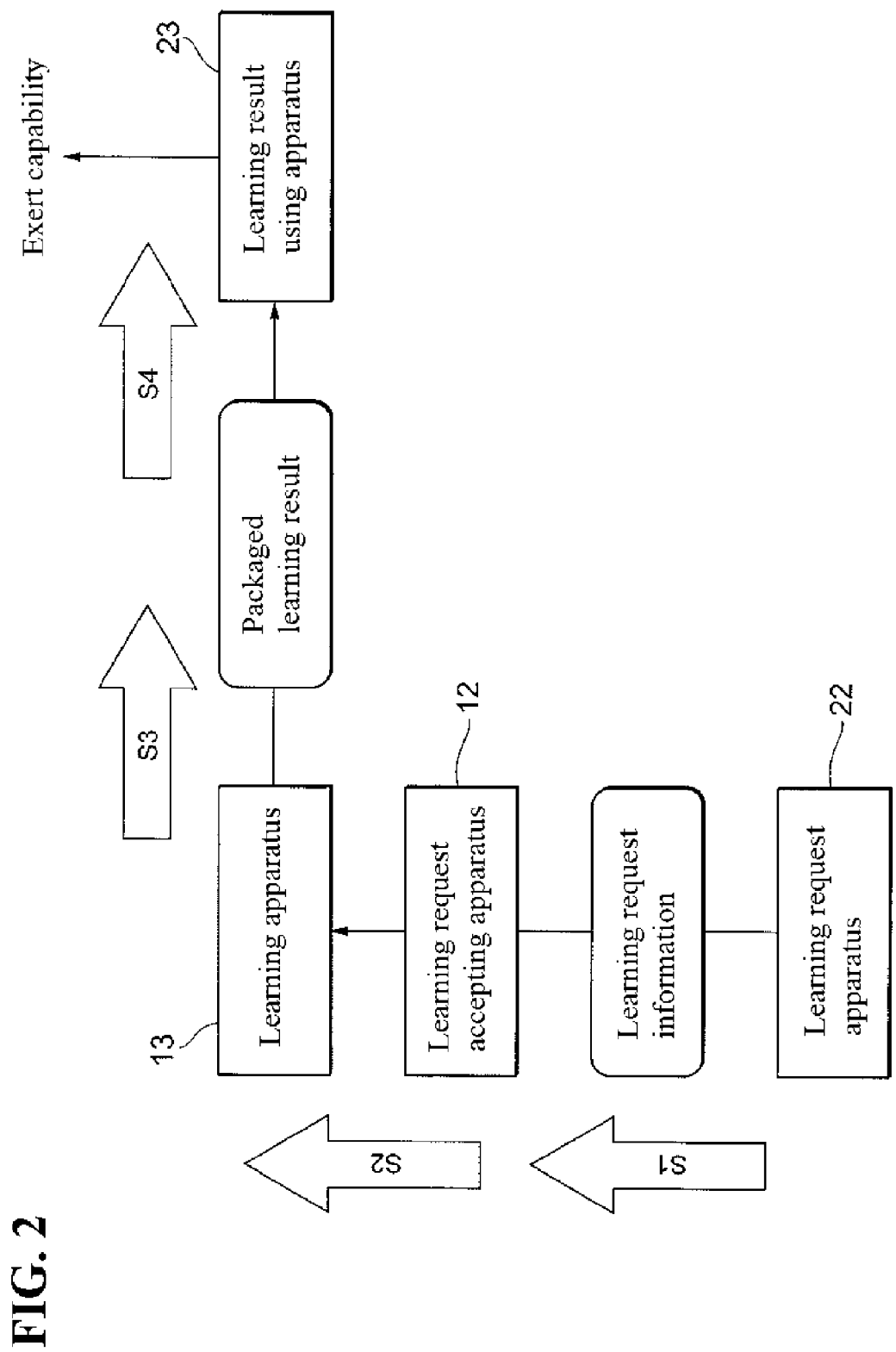
FIG. 2 is a diagram conceptually showing the flow of the learning service in this embodiment.

FIG. 2 is a diagram conceptually showing the flow of the learning service according to the systems shown in FIG. 1. The learning request system 2 accesses the learning service assignment system 1 via the network N. and requests machine learning of a capability that is to be added to the learning result using apparatus 23. Information necessary to perform machine learning (hereinafter, alternatively referred to as "learning request information") is provided from the learning request apparatus 22 to the learning request accepting apparatus 12 of the learning service assignment system 1 (S1). Examples of the learning request information include an object of learning, information for identifying an apparatus that uses a learning result, learning data, and the like.

The learning request information is transmitted from the learning request accepting apparatus 12 to the learning apparatus 13 (S2). The learning apparatus 13 performs a learning process based on the learning request information, and acquires a new capability as a result of the learning. The learning result is converted into copiable packaged data (S3: hereinafter, alternatively referred to simply as "learning result"). The learning result converted into the data is transmitted from the learning apparatus 13 to the learning result using apparatus 23 of the learning request system 2

(S3). If the learning result using apparatus 23 uses the learning result, the capability is exerted (S4).

2. Function 2-1. Learning Request System 2

Next, the function of the learning request system 2 will be described with reference to FIGS. 3 to 5. The configuration of the learning request system 2 is not limited to that described below, and, for example, the learning request system 2 may be configured by a single apparatus.

First, the learning data input apparatus 24 acquires target-related information that is to be input to a later-described neural network 233 of the learning result using apparatus 23, or data that is to be input to the learning data preparing apparatus 21. For example, as the learning data input apparatus 24, any input apparatus such as a camera, a sensor, a network terminal, a sensor of an automatic running robot, or the like may be used.

Figure 3:
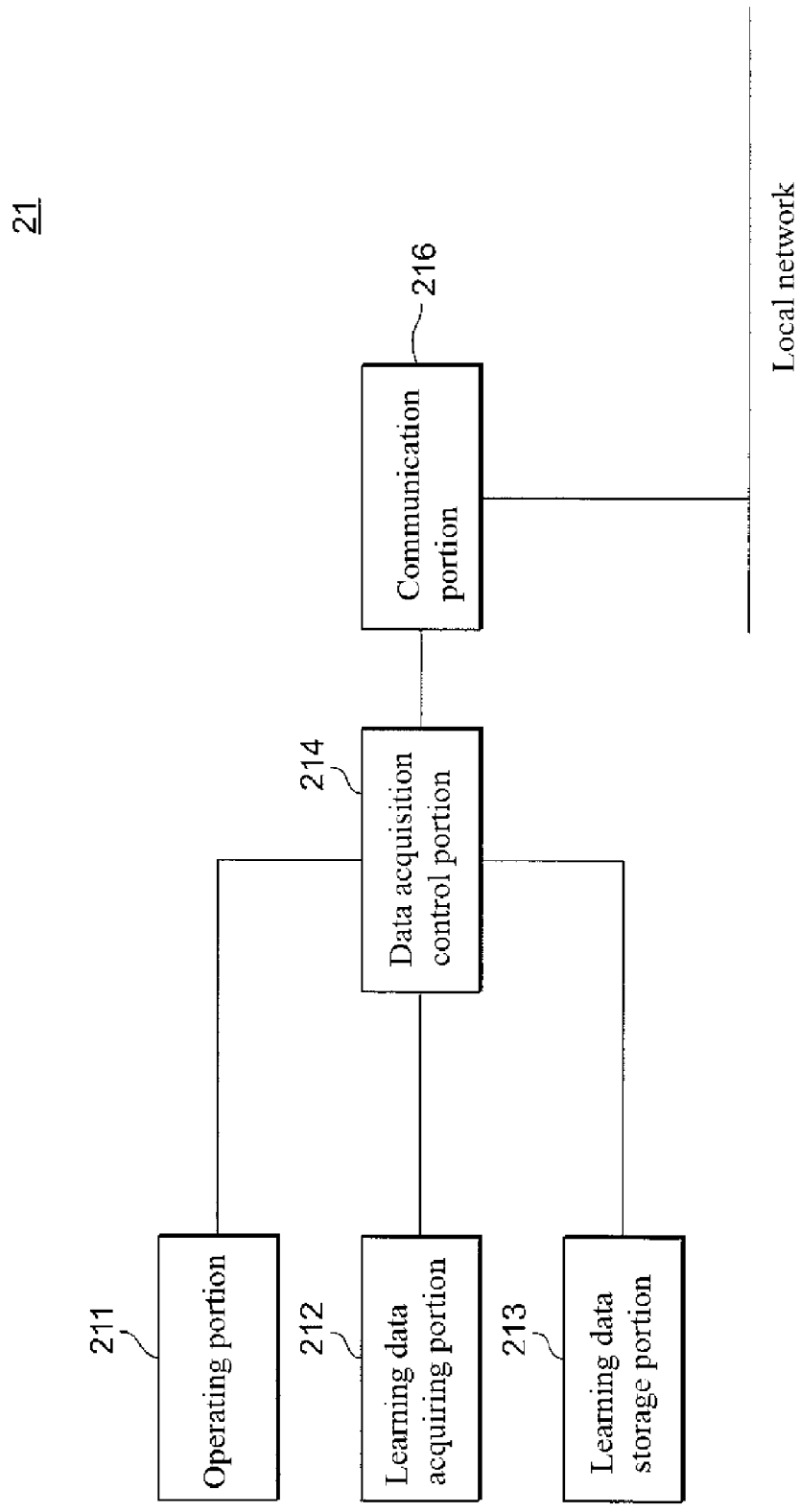
FIG. 3 is a block diagram showing an example of the configuration of a learning data preparing apparatus.

FIG. 3 is a functional block diagram of the learning data preparing apparatus 21 in this embodiment. The learning data preparing apparatus 21 has a function of preparing data (learning data) necessary for a learning module (e.g., a later-described neural network 233) to perform learning. As shown in FIG. 3, the learning data preparing apparatus 21 includes, as functional portions, an operating portion 211, a learning data acquiring portion 212, a learning data storage portion 213, and a data acquisition control portion 214.

For example, the operating portion 211 accepts an operation from a user (hereinafter, alternatively referred to as "requester") of the learning request system 2. The learning data acquiring portion 212 acquires data necessary to create learning data from the learning data input apparatus 24, and stores it in the learning data storage portion 213. The data acquisition control portion 214 controls the operating portion 211, the learning data acquiring portion 212, and the learning data storage portion 213 to prepare data necessary to perform learning (to perform a learning process). A communication portion 216 is connected to a local network of the learning request system 2, and transmits the data necessary to perform learning, created by the data acquisition control portion 214, to another apparatus.

Note that the learning data preparing apparatus 21 may be configured by the same apparatus as a later-described learning result using apparatuses 23. In this case, the learning data preparing apparatus 21 may also be configured as an input apparatus that is externally connected to the learning result using apparatuses 23.

Figure 4:
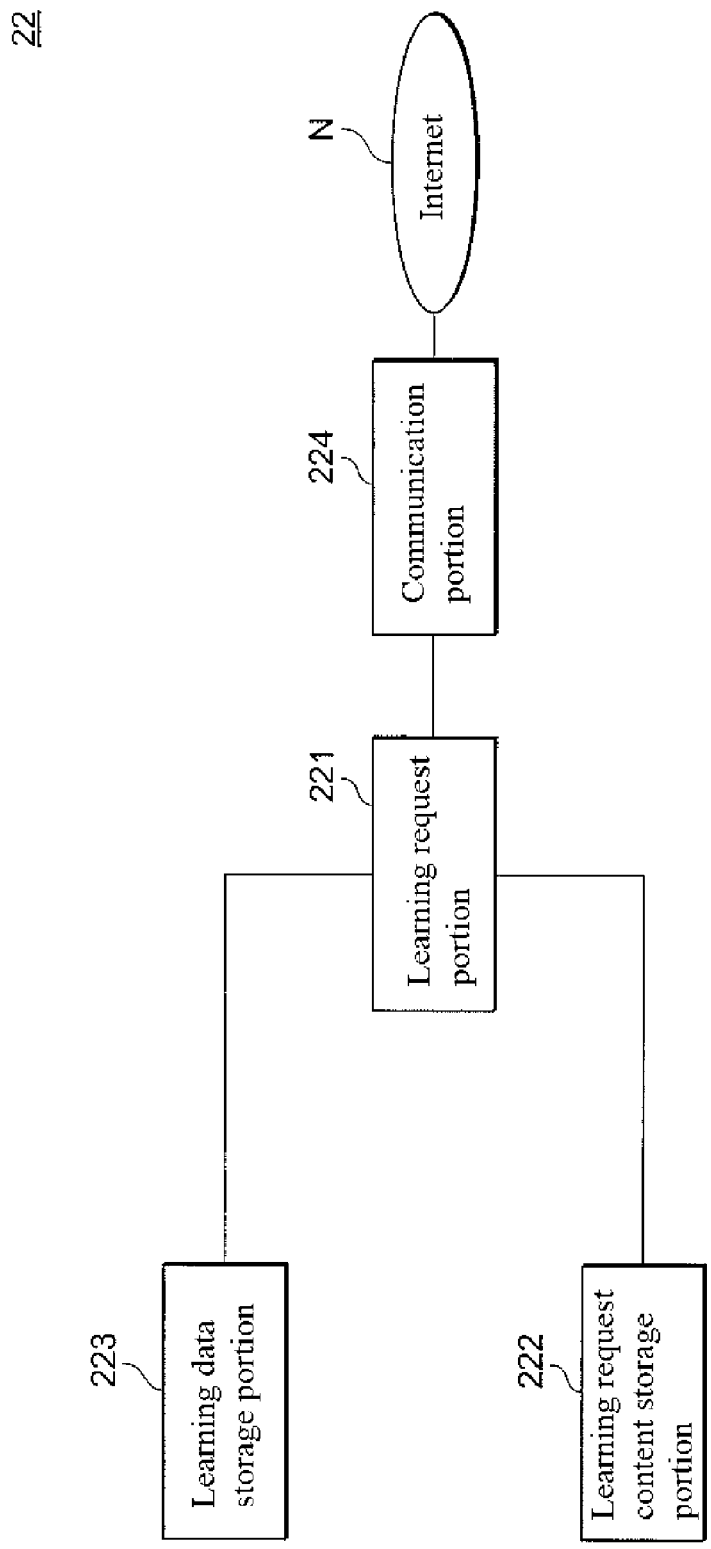
FIG. 4 is a block diagram showing an example of the configuration of a learning request apparatus.

FIG. 4 is a functional block diagram of the learning request apparatus 22 in this embodiment. The learning request apparatus 22 has a function of transmitting learning request information to the learning service assignment system 1. As shown in FIG. 4, the learning request accepting apparatus 12 includes a learning request portion 221, a learning request content storage portion 222, a learning data storage portion 223, and a communication portion 224.

The learning request portion 221 accepts a learning request from a requester, creates learning request information, and transmits the learning request information via the communication portion 224 to the learning service assignment system 1. The learning request information transmitted at this time is stored in the learning request content storage portion 222. Also, the learning data transmitted from the learning data preparing apparatus 21 is stored in the learning data storage portion 223.

Furthermore, the learning request apparatus 22 may determine whether or not a learning result that has been input matches a purpose of use, referring to identifying information (which will be described later) assigned to the learning result. If the learning result matches a purpose of use, the learning request apparatus 22 incorporates the learning result into the learning result using apparatuses 23, thereby allowing the learning result to be used. On the other hand, if the learning result does not match a purpose of use, the learning request apparatus 22 may give notice of non-match to the learning service assignment system 1. At this time, the learning request apparatus 22 may give a learning request again with a different condition.

Figure 5:
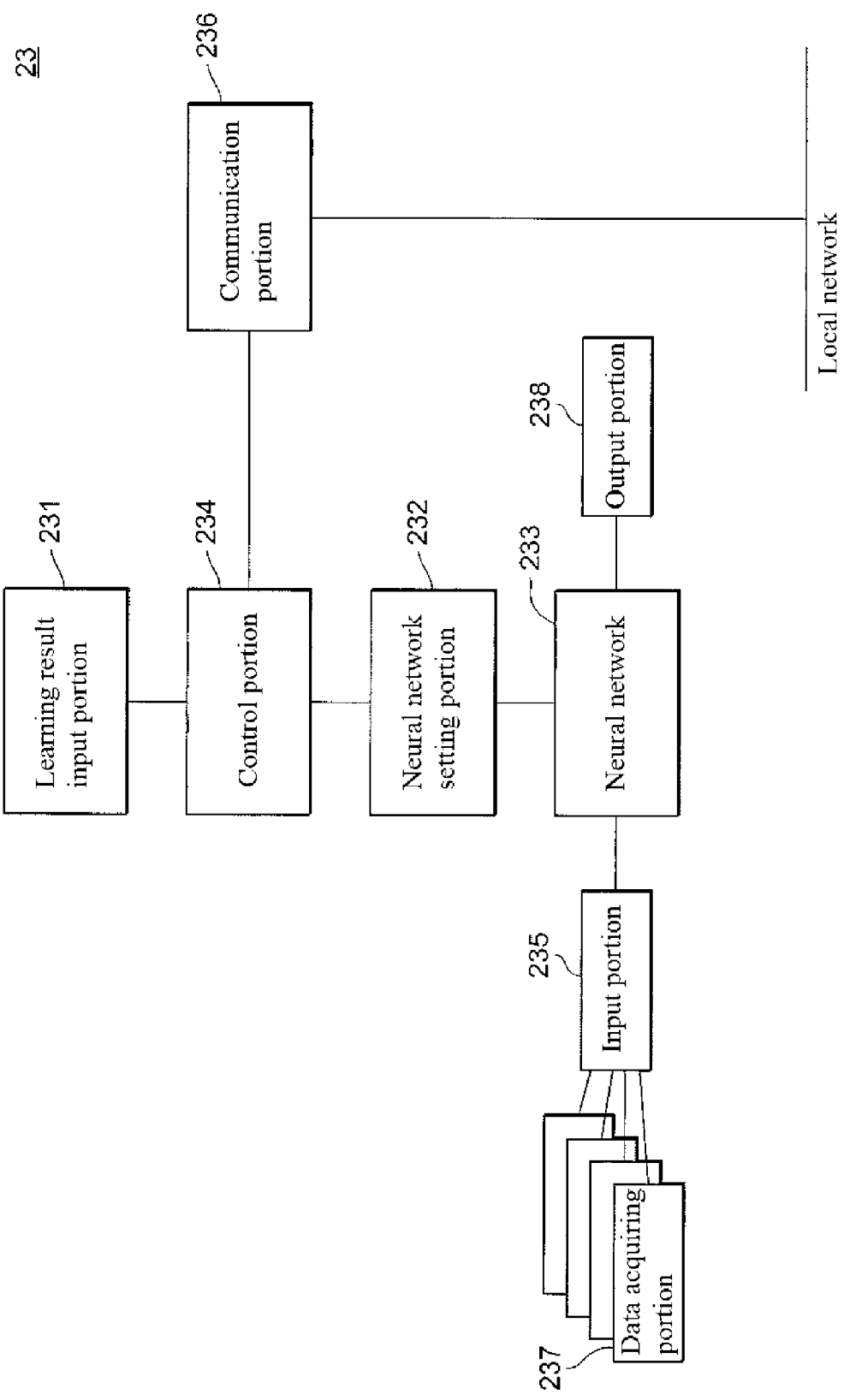
FIG. 5 is a block diagram showing an example of the configuration of a learning result using apparatus.

FIG. 5 is a functional block diagram of the learning result using apparatus 23 in this embodiment. The learning result using apparatus 23 has a function of providing a new capability to a user, using the learning result. As shown in FIG. 5, the learning result using apparatus 23 includes, as functional portions, a learning result input portion 231, a neural network setting portion 232, a neural network 233, a control portion 234, an input portion 235, a communication portion 236, a data acquiring portion 237, and an output portion 238.

The learning result input portion 231 accepts input of a learning result. At this time, the neural network setting portion 232 sets the neural network 233 according to a purpose of use. The control portion 234 controls the data acquiring portion 237 and the input portion 235 to input data necessary to use the learning result, to the neural network 233, thereby allowing the learning result to be used. The result obtained by using the learning result is output via the communication portion 236 by the output portion 238.

2-2. Learning Service Assignment System 1

Next, the function of the learning service assignment system 1 will be described with reference to FIGS. 6 to 10. The learning service assignment system 1 can be implemented using a data sensor or cloud. In this case, the apparatuses of the learning service assignment system 1 can be configured using PC servers or blade PCs. If the apparatuses of the learning service assignment system 1 are configured by a plurality of PCs, the processing time can be shortened when repeated operations in deep learning or the like are to be executed. The learning service assignment system 1 may be configured by one PC, or may be implemented by an embedded apparatus.

Figure 6:
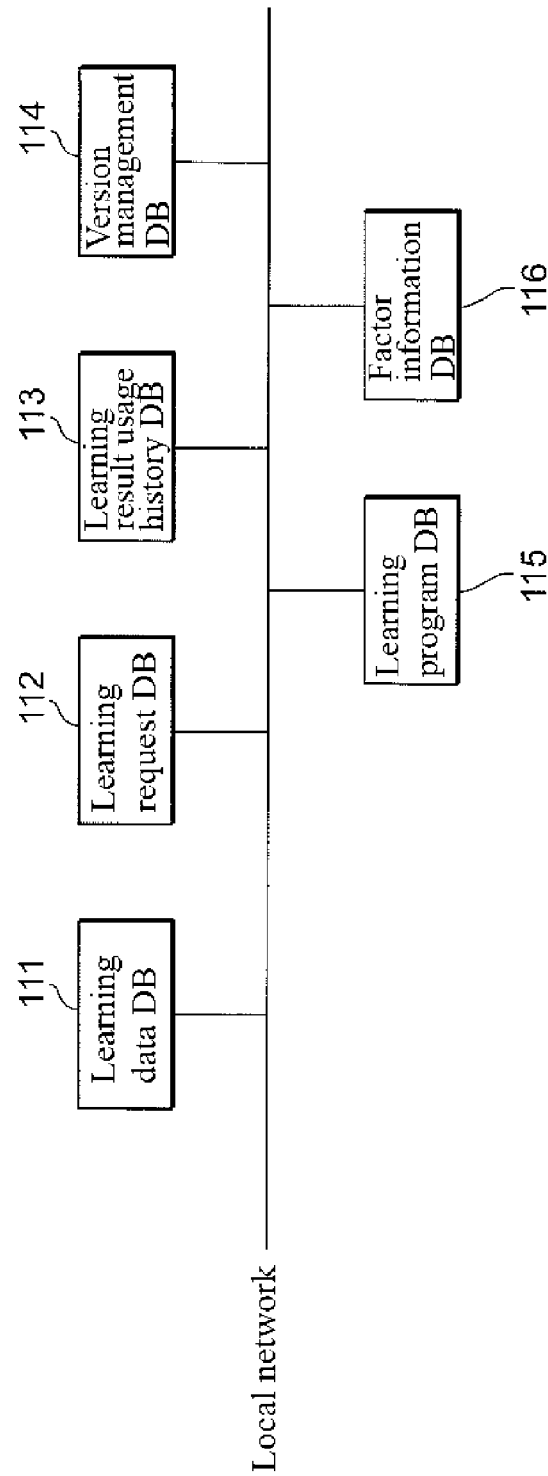
FIG. 6 is a block diagram showing an example of the configuration of a learning database.

FIG. 6 is a block diagram showing the configuration of the learning database 11 in this embodiment. The learning database 11 stores various types of information necessary to perform learning. As shown in FIG. 6, the learning database 11 includes a learning data DB 111, a learning request DB 112, a learning result usage history DB 113, a version management DB 114, a learning program DB 115, and a factor information DB 116.

The learning data DB 111 stores learning data that is used for learning. For example, the learning data DB 111 can store the learning data in association with learning details such as a target of the learning data, a breakdown of the learning data, the range of the learning data, an object of the learning data, and the like.

The learning request DB 112 stores learning request information, and a content of a learning process that is performed when the learning request information is accepted from the learning request apparatus 22. For example, the learning request DB 112 can store the learning request information in association with learning request details such as information related to a learning requester, a target of the learning data, a breakdown of the learning data, the range of the learning data, an object of the learning data, and the like.

The learning result usage history DB 113 stores a usage history of learning results. For example, if a classifying capability is acquired as a result of learning, the learning result usage history DB 113 can store information related to results obtained by performing classification using the acquired classifying capability. Furthermore, the learning result usage history DB 113 can store information related to use of a learning result in association with use of learning such as information related to a user of the learning result, a target of the learning data, a breakdown of the learning data, the range of the learning data, an object of the learning data, and the like. The learning result usage history DB 113 preferably includes use identifying information. The use identifying information is information for identifying use of a learning result, and examples thereof include an ID of an apparatus that uses the learning result, and information related to settings (a later-described basic factor, influential factor, etc.) that have an influence on capabilities. The acquired capability may change in accordance with an apparatus that uses the capability or an environment in which the capability is used, and thus a usage history can be recorded in more detail by causing the learning result usage history DB 113 to include the use identifying information.

The version management DB 114 stores information related to a capability variation acquired through learning. For example, the version management DB 114 can store information related to a capability variation for each learning result. The information that is stored in the version management DB 114 includes later-described learning result identifying information.

The learning program DB 115 stores a learning program for performing learning. For example, the learning program DB 115 can store the learning program in association with learning details such as a target of the learning, a content of the learning data, an object of the learning, and the like. In the learning program DB 115, a large number of learning programs are preferably registered. In this case, a later-described learning apparatus 13 can specify and execute a learning program from the learning program DB 115, by designating learning details.

The factor information DB 116 stores information related to factors that have an influence on a learning result and capabilities acquired as a result of learning. The information that is stored in the factor information DB 116 is hierarchically managed, and has a tree-like structure. In this embodiment, the factors are roughly classified into basic factors and influential factors. The basic factors are used to identify a learning result in an upper hierarchy level. Meanwhile, the influential factors are factors that have an influence on a learning result, other than the basic factors. In the factor information DB 116, ID information for identification is assigned to each factor that is stored, so that the factors can be distinguished from each other.

Next, an example of information related to factors that are stored in the factor information DB 116 will be described with reference to FIGS. 7A and 7B. Although a description in this embodiment will be given on an example in which the factors are classified into basic factors and influential factors, the factor classifying method is not limited to this, and the factors may be classified into three or more groups, or may be managed in one group.

FIG. 7A is a table showing an example of correspondence relationships between basic factors and ID types allocated to the basic factors. The basic factors are factors with which learning results can be divided into groups.

Since learning is performed in order to acquire a predetermined capability, the learning can be identified with an acquired capability. Accordingly, the type of an acquired capability is managed with an ID that is assigned thereto. Furthermore, learning is performed based on a request from a learning requester, and different learning is performed for each learning request. Accordingly, the learning result can be identified also with a learning requester (requester ID). Furthermore, all learning is performed based on learning data, and thus the learning result can be identified with a target of the learning data. The target of the learning data can be specified with an acquisition source of input data or an acquisition period, and thus these factors are also managed as basic factors with IDs (an input data ID and an acquisition period ID) that are assigned thereto.

Furthermore, even when acquired capabilities are the same (acquired capability IDs are the same), the capabilities may change in accordance with a specification of an apparatus that uses the capability or an environment in which the capability is used. Accordingly, an apparatus that uses the capability and a target for which the capability is used are also managed as basic factors with an apparatus ID and a target ID that is assigned thereto. The basic factors are not limited to those shown in FIG. 7A, and part of the basic factors in FIG. 7A may be selectively used, or other factors may be included as long as learning results can be divided into groups.

Figure 7B:
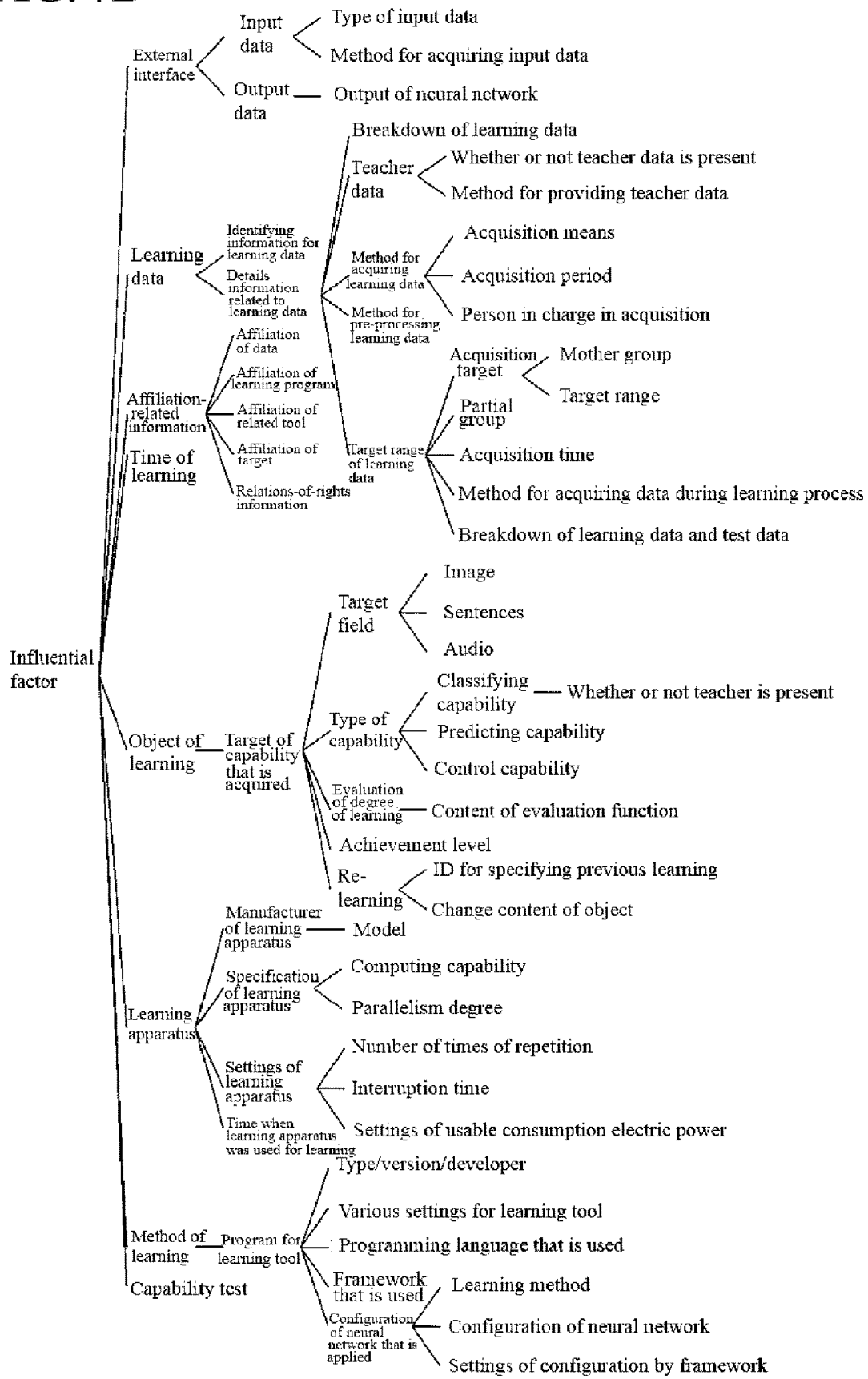
FIG. 7B is a diagram showing an example of influential factors.

FIG. 7B is a diagram showing an example of mutual relationships between influential factors. The influential factors are additionally registered in the factor information DB 116, for example, based on parameters, conditions, and the like that have been set in previous learning. As shown in FIG. 7B, the influential factors preferably have mutual relationships resulting in a tree structure. Although not shown in FIG. 7B, an ID for identification is assigned to each influential factor. The ID assigned to each influential factor is preferably assigned such that the hierarchy structure becomes apparent.

As shown in FIG. 7B, the uppermost hierarchy level of the influential factors is constituted by, for example, an external interface, learning data, affiliation-related information, time of learning, an object of learning, a learning apparatus, a method of learning, and a capability test.

The external interface is a factor related to, for example, an interface between a learning program and the outside, such as the type of input data or the type of output data.

Furthermore, the learning data is a factor related to data that is used for learning. If learning data is provided with an ID and managed in the factor information DB 116, the learning data can be managed while keeping the details thereof confidential.

The affiliation-related information is a factor depending on information related to an affiliation of a learning program (i.e. where the learning program belongs to) or the like. If each piece of affiliation-related information has relations of rights, they are preferably managed as lower-level factors of the affiliation-related information in the factor information DB 116.

The time of learning is a factor depending on the time when learning was performed. The object of learning is a factor depending on a variety of objects set for each learning process.

The learning apparatus is a factor depending on the apparatus that performs the learning process. If the learning is performed on a cloud, the name of the cloud providing company or its network address may be used as a lower-level factor of the learning apparatus, instead of a model of the apparatus.

The method of learning is a factor depending on a method for performing learning. Although not shown in FIG. 7B, the configuration of the neural network, which is a lower-level factor of the method of learning, preferably has, as factors in an even lower level, for example, specific learning methods such as SVM or regression model methods that are methods that have existed prior to deep learning, deep belief networks, Deep Boltzmann machines, stacked autoencoders, autoencoders, restricted Boltzmann machines (RBM), dropout, sparse coding, regularization, denoising autoencoders, the type of activation function, sigmoid function, softsign, softplus, Relu, the type of random number sequence, or the like. Furthermore, lower-level factors of the settings of the configuration of a neural network preferably include information related to specific settings of the neural network, such as hyper-parameters, the configuration of the input layer, the number of layers, the number of units of the hidden layer, the content of each layer (CNN (convolutional neural network), RNN (recurrent neural network), Elman network, Jordan network, ESN (echo state network), LSTM (long short term memory network), BRNN (bi-directional RNN), and the like.

The capability test is a factor depending on test details that a learning result has to satisfy. If a capability test is performed, the learning result is influenced so as to be changed such that the details are satisfied, and thus the capability test is also managed as an influential factor.

Note that, for example, in a learning method using random numbers such as deep learning, an acquired capability may be slightly different each time learning is performed. In such a case, a learning start time, a learning end time, and an ID of an learning apparatus are preferably managed as influential factors, with identifying IDs assigned thereto.

Furthermore, a plurality of the influential factors may be regarded as being the same. In that case, classes of a plurality of factors may be taken as a group, and given the same identifying ID. Furthermore, the influential factors are not limited to those described above. Various influential factors may be used according to learning target, learning object, and learning environment.

Since the learning database 11 according to this embodiment has the above-described configuration, each of several different learning results can be identified and managed, and thus whether or not learning results are identical can be determined by the learning service assignment system 1. The DBs included in the learning database 11 can be used via networks such as local networks by the learning request accepting apparatus 12, the learning apparatuses 13, the learning management apparatus 14, and the like.

FIG. 8 is a functional block diagram of the learning request accepting apparatus 12 in this embodiment. The learning request accepting apparatus 12 has a function of accepting learning request information from the learning request apparatus 22 and transmitting the learning request information to the learning apparatuses 13. As shown in FIG. 8, the learning request accepting apparatus 12 includes, for example, a learning request accepting portion 121, a learning data storage portion 123, a learning request content storage portion 124, and a communication portion 125.

The learning request accepting portion 121 accepts a learning request from the learning request apparatus 22. The learning request accepting portion 121 registers learning request information contained in the accepted learning request, in the learning request DB 112. At this time, the learning request accepting portion 121 transmits a notice indicating that a learning request has been accepted, via the communication portion 125 to the learning management apparatus 14. Furthermore, the learning request accepting apparatus 12 can temporarily store the accepted learning request in the learning data storage portion 123 or the learning request content storage portion 124.

Figure 9:
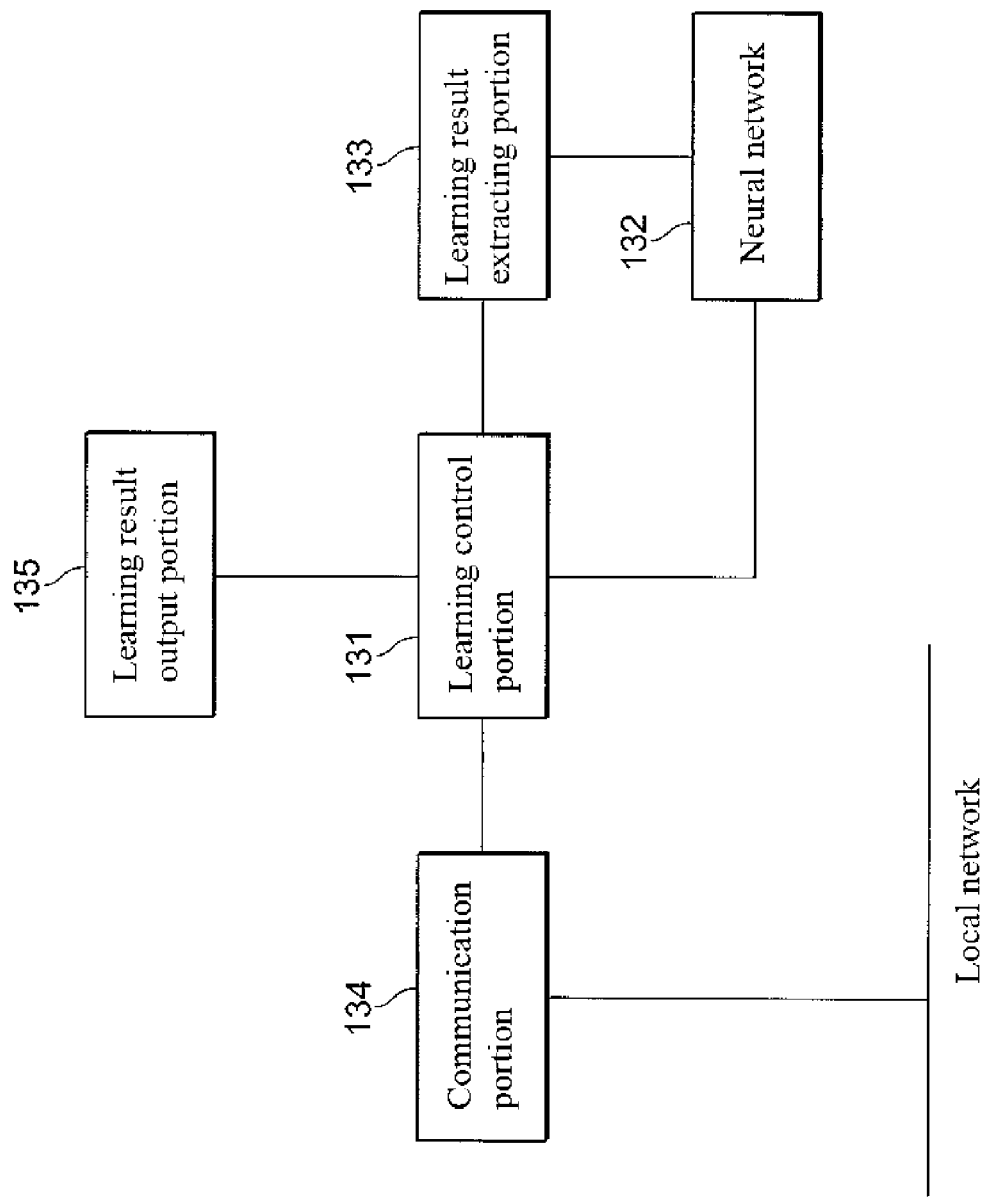
FIG. 9 is a block diagram showing an example of the configuration of a learning apparatus.

FIG. 9 is a functional block diagram of the learning apparatus 13 in this embodiment. The learning apparatus 13 has a function of performing learning based on learning request information, and acquiring a new capability as a result of the learning. As shown in FIG. 9, the learning apparatus 13 includes, as functional portions, a learning control portion 131, a neural network 132, a learning result extracting portion 133, a communication portion 134, and a learning result output portion 135.

The learning apparatus 13 can perform learning based on learning request information, by causing the learning control portion 131 to control the neural network 132. The learning result is extracted by the learning result extracting portion 133, and is output via the communication portion 134 by the learning result output portion 135.

If the learning apparatus 13 performs learning (a learning process) a plurality of times, a plurality of learning results are obtained. If conditions that have an influence on the learning result, such as learning data, a learning program, learning time, or an object of the learning process, are different between learning processes, the capabilities obtained as a result of the plurality of learning processes may not be the same. Although described later in detail, if capabilities obtained as a result of the plurality of learning processes in the learning service assignment system 1 according to this embodiment may not be the same, they may also be managed as variations, with different identifying information assigned thereto.

Note that the learning apparatus 13 itself may also give a learning request. In this case, the learning apparatus 13 can perform autonomous learning.

Figure 10:
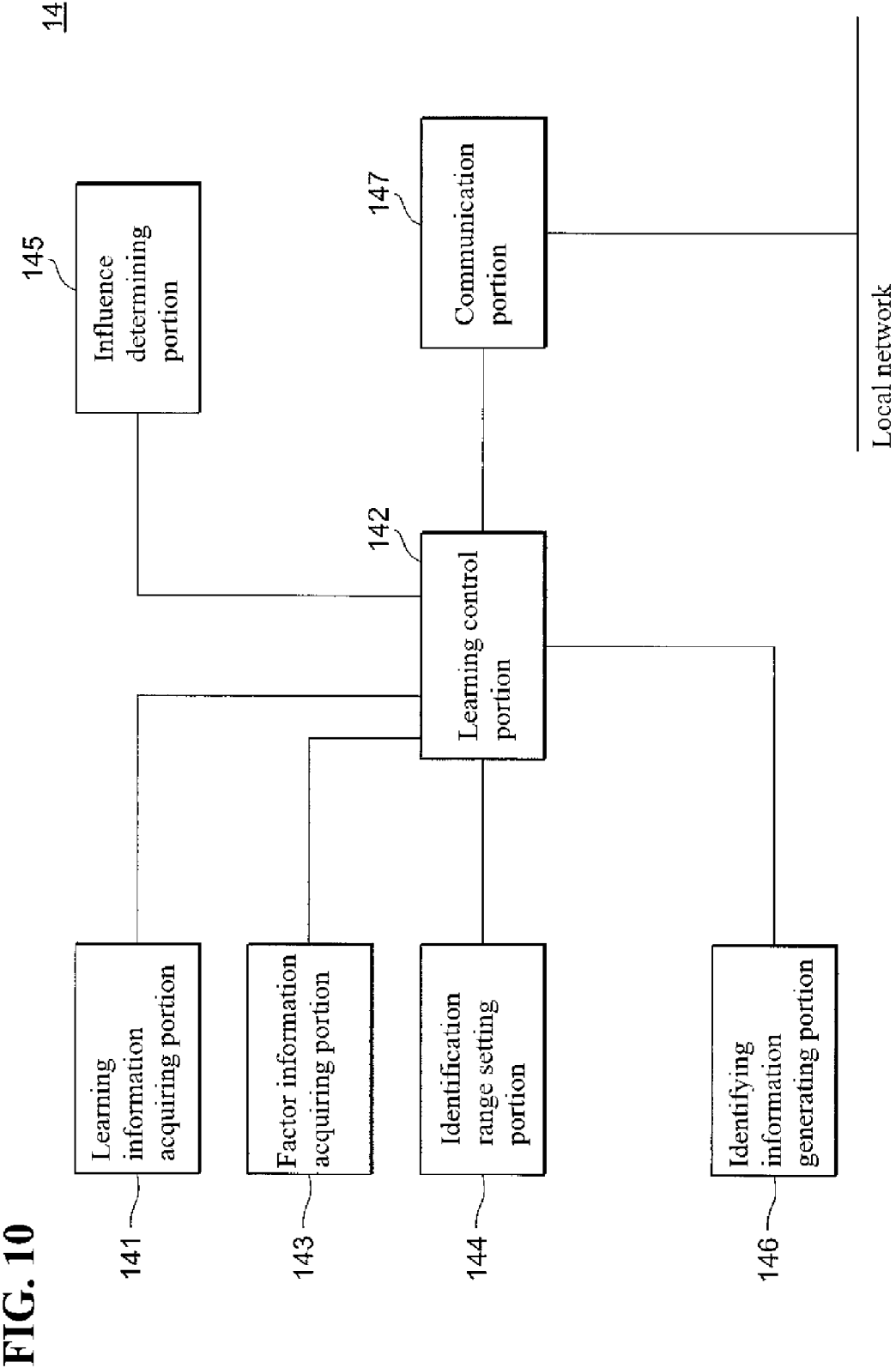
FIG. 10 is a block diagram showing an example of the configuration of a learning management apparatus.

FIG. 10 is a functional block diagram of the learning management apparatus 14 in this embodiment. The learning management apparatus 14 manages a learning result. In the learning service assignment system 1 that provides a learning service, it is desirable that all learning results in the learning service assignment system 1 are managed individually (i.e. independently from each other). Accordingly, in the learning service assignment system 1, all learning results are managed by the learning management apparatus 14 such that they can be distinguished from each other. For example, if learning is performed under conditions where any of the influential factors is different, the learning results may be different. That is to say, if the configuration of an influential factor is changed, the learning result is influenced in a different manner, and thus many learning result variations may occur. The learning management apparatus 14 identifies (distinguishes) the variations in order to manage these learning results.

As shown in FIG. 10, the learning management apparatus 14 includes a learning information acquiring portion 141, a learning control portion 142, a factor information acquiring portion 143, an identification range setting portion 144, an influence determining portion 145, an identifying information generating portion 146, and a communication portion 147.

The learning information acquiring portion 141 acquires learning request information via the communication portion 147.

The learning control portion 142 selects a learning apparatus 13 that performs a learning process and a learning program, based on the learning request information, and gives a learning instruction. Furthermore, the learning control portion 142 has a function of assigning identifying information generated by the identifying information generating portion 146 to a learning result obtained by attaining a predetermined capability through a learning process. The assigning of identifying information to a learning result is a concept that encompasses associating a learning result and identifying information, and examples thereof include adding the identifying information to data of the learning result, and storing the learning result and the identifying information in association with each other in a storage apparatus. Examples thereof further include, in addition to directly associating the learning result and the identifying information, indirectly associating them. For example, a case in which a learning result is associated with an identifier (e.g., a serial number) for identifying the learning result itself, and the identifier and the identifying information are associated with each other is also included in the assignment of the identifying information to the learning result.

The factor information acquiring portion 143 acquires a list of factors that may have an influence on a learning result, from the factor information DB 116. For example, the factor information acquiring portion 143 can acquire information corresponding to the tree structure of influential factors shown in FIG. 7B (hereinafter, alternatively referred to as "influential factor list").

The identification range setting portion 144 sets ranges (identification ranges) in which variation identification is necessary (ranges in which variations need to be distinguished). The identification ranges are ranges for identifying what kind of learning was performed, for each capability acquired as a result of performing learning by machine learning. The specifying of identification ranges corresponds to dividing learning results into groups. It is sufficient that learning result variations can be identified (distinguished) within ranges in which they need to be identified. That is to say, if identification ranges are different from each other, learning results do not have to be distinguished from each other between the different identification ranges. For example, if learning requesters are different from each other, it may not be problematic that variations cannot be distinguished from each other. More specifically, it is sufficient that a certain learning requester can be identified within the range in which that learning requester gave requests, and variations do not have to be uniquely identified between learning results of that learning requester and others. For example, the identification range setting portion 144 can set an identification range using the identification range list.

Figure 11:
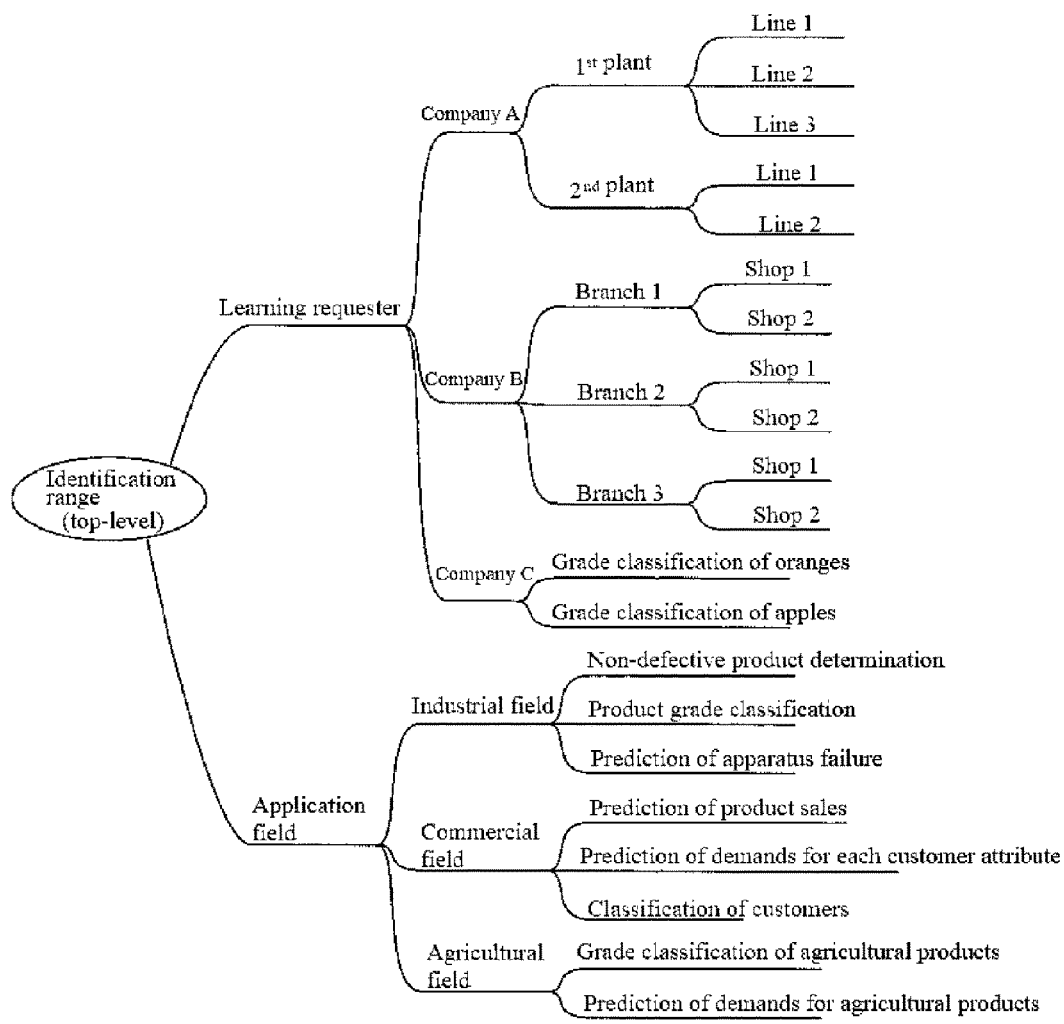
FIG. 11 is a diagram showing an example of an identification range list.

FIG. 11 is a diagram showing an example of an identification range list. As shown in FIG. 11, the identification ranges are, for example, hierarchically configured, and lower-level identification ranges can be included in upper-level identification ranges. Specifically, a group including all identification ranges is the top-level identification range (hereinafter, referred to as "first layer") in the entirety. In the identification range in the first layer, all learning results have to be distinguished from each other. For example, if all learning results of learning service providers have to be distinguished from each other, the identification range setting portion 144 sets an identification range in the first layer.

In the example in FIG. 11, identification ranges in the second layer under the first layer are groups defined according to a learning requester or an application field. If the identification range setting portion 144 sets the identification ranges respectively for learning requesters (in a second hierarchy level), learning results are assigned identifying information for identifying the learning requesters, generated by the identifying information generating portion 146. Identification ranges in the third layer under the second hierarchy level can be defined e.g. by company (in the case in FIG. 11, company A, company B, and company C) or application field type (in the case in FIG. 11, industrial field, commercial field, and agricultural field). In this case, if the identification ranges are set respectively for companies (in the third hierarchy level), identifying information for identifying the companies is generated. Furthermore, for example, if a certain company (company A) has a plurality of plants, and performs learning processes related to targets that are different between plants or plant lines, the identification range setting portion 144 may set the identification ranges respectively for the plants (in the fourth layer) or for the lines (in the fifth layer) of company A. Note that, in this case, the identification range setting portion 144 may set lower-level identification ranges for the other companies (company B or company C), based on elements different from those for company A.

If the identification ranges have a hierarchy structure, identifying information corresponding to upper-level identification ranges can be excluded from identifying information corresponding to lower-level identification ranges, and thus the volume of the identifying information can be reduced.

Note that the identification ranges set by the identification range setting portion 144 are not limited to those described in the foregoing example, and may be freely set. For example, the identification ranges may be set based on basic factors or influential factors. In this case, the identification range list may have a configuration corresponding to an influential factor list. For example, the tree structure of the influential factors is preferably reflected in the hierarchy structure of the identification ranges corresponding thereto. Specifically, if the identification range classified as the influential factor "external interface" in FIG. 7B is an identification range of the third layer (level), then the influential factor "input data" located under the external interface is, for example, an identification range of the fourth layer. At this time, the identification range setting portion 144 can set identification ranges based on the hierarchy levels to which the influential factors contained in learning request information belong, in the tree structure of the influential factors shown in FIG. 7B. The identification range setting portion 144 may also set identification ranges according to combinations of basic factors contained in learning request information.

Furthermore, the method in which the identification range setting portion 144 sets identification ranges is not limited to the method using an identification range list. For example, groups can be directly handled by using a programming language including the groups as classes.

The influence determining portion 145 determines the degree of influence by the influential factors on the learning result, based on the influential factor list acquired by the factor information acquiring portion 143.

For example, the influence determining portion 145 can determine the degree of influence by the basic factors or the influential factors on the learning result, using an influence determination logic created for each identification range. The influence determination logic is a logic for determining the influence that the basic factors or the influential factors have on the learning program contained in the identification range. If a factor (a basic factor, an influential factor) that may have an influence on the learning result is given as input, the influence determination logic determines whether or not each factor has an influence on the learning result. Specifically, the influence determination logic associates, for each learning program, a factor (a basic factor, an influential factor) that has an influence on the learning result and the degree of influence on the learning result according to a condition (e.g., learning data, an ID of a learning requester, an object of learning, etc.) given to that factor, and determines the degree of influence, based on that correspondence relationship.

In the influence determination logic, for example, factors with which the learning results completely match each other between two specific sets of learning may be regarded as having no influence. Furthermore, factors with which the learning results are determined as being closer to each other under a predetermined condition may also be regarded as having no influence.

The influence determination logic is created by, for example, a creator of the learning program. If it is difficult to create an influence determination logic that can be applied to all learning programs contained in a certain identification range, the identification range may be divided and an influence determination logic may be created for each divided identification range.

Note that the creator of the influence determination logic is not limited to the creator of the learning logic as long as he or she is a person who knows the details of the learning logic. In order to create an influence determination logic, it is necessary to know the details of the learning logic, such as the content of the configuration regarding whether or not random numbers are used within the learning logic, switching conditions if learning logics are switched under a predetermined determination condition according to the type or the number of sets of data that are input, designated items (the configuration of a neural network, an end condition, etc.) regarding a learning method, and the like. Accordingly, a person who knows the details of the learning logic will be able to create an influence determination logic.

Meanwhile, data that is given as input to an influence determination logic includes data that are not known to the creator of the learning logic. For example, learning data used when performing learning and influential factors designated by a learning requester are not known to the creator of the learning logic if the learning requester is different from the creator of the learning logic. Examples of the influential factors designated by a learning requester include the following.

Model of apparatus that uses learning result, model of sensor for use

The number of classified groups of classifying capability that is acquired

Language required for language processing capability

The influence determining portion 145 extracts the above-described information that is not known to the creator of the learning program, from the learning request information, and gives this information as input to an influence determination logic that is known only to the person who knows the configuration of the learning program. Accordingly, the influence by the basic factors or the influential factors on the learning result when learning is performed can be determined, and learning result variations can be managed. Furthermore, in the case of a learning service, there is information that is known only to the learning service assignment system 1, such as information when accepting a learning request, information on the learning program that is selected, information on learning data that is selected, and the like. These pieces of information are preferably input by the influence determining portion 145 to the influence determination logic when performing learning.

Furthermore, the influence determination logic may also be used to determine the influence by learning data. In many cases, a difference in learning data has an influence on a learning result, but the learning data is designated when performing learning, and may not be designated by the creator of the learning program. Also in this case, it is possible to create a logic for determining whether or not there is an influence due to learning data, if information related to the content of the used learning data can be acquired. Specifically, when the learning data preparing apparatus 21 prepares learning data, information related to the learning data that is prepared is acquired and an identifying ID thereof is recorded, and thus detailed information on the learning data can be recorded.

Note that the method by which the influence determining portion 145 determines an influence by factors on the learning result is not limited to that described above. For example, if a predetermined learning program is used as a learning tool, the influence determining portion 145 may also determine whether or not there is an influence due to a change in the use method or the settings in this program. For example, it is possible to allow the influence determining portion 145 to detect a change in the settings, by adding information related to the changed settings to the learning data. Specifically, for example, when a threshold of a sensor is changed, it is possible to allow the influence determining portion 145 to detect the change in the settings, by adding information related to a threshold after the change as well as a threshold before the change. Furthermore, it is possible to allow the change in the settings to be detected, by also adding information such as an ID or a tag.

Meanwhile, for example, if learning is performed twice without changing settings regarding learning or learning data, there is no change in the influential factors other than that learning is performed twice. However, for example, if random numbers are used inside the learning program, capabilities acquired as a result of learning performed a plurality of times under the same conditions may be different from each other. In this case, the influence determination logic determines that the number of times of learning has an influence on a learning result. Accordingly, a later-described identifying information generating portion 146 can assign identifying information such as "number of times of learning=first time" or "number of times of learning=second time".

The method for determining whether or not there is an influence is not limited to that described above, and any methods may be used. For example, a person in charge of acquiring learning data may input information for identification, by operating a keyboard and a mouse (the operating portion 211) of the learning data preparing apparatus 21. Furthermore, it is also possible to determine whether or not there is an influence, by ascertaining a difference in the request contents, based on information contained in the learning request information from the learning request apparatus 22.

The identifying information generating portion 146 generates identifying information such that learning result variations can be distinguished from each other according to the range (e.g., the identification range set by the identification range setting portion 144) in which a learning result is used. For example, the identifying information generating portion 146 assigns identifying information to the learning result, based on a factor that has an influence on the learning result. Specifically, the identifying information generating portion 146 selects an influence determination logic, based on a learning program corresponding to learning request information. Next, the identifying information generating portion 146 inputs the identification range and the influential factor list to the selected influence determination logic. The identifying information generating portion 146 generates data from which identifying information is to be generated, such that all influential factors determined by the influence determination logic as having an influence on the learning result are included. Furthermore, the identifying information generating portion 146 converts the data from which identifying information is to be generated, according to a predetermined method, thereby generating learning result identifying information.

Next, the processing by the identifying information generating portion 146 will be described in more detail. The influential factors have a tree structure as described above (see FIG. 7B). The identifying information generating portion 146 deletes, from the tree structure, branches not including any influential factors determined as being an influential factor that has an influence, according to the influence determination logic. This processing is sequentially performed from upper layers to lower layers in the tree structure, thereby creating a tree (hereinafter, alternatively referred to as "influential factor description information"). The identifying information generating portion 146 can obtain a data sequence acquired by sequentially enumerating from upper layers the IDs of influential factors contained in the influential factor description information, as the data from which identifying information is to be generated. For example, the data sequence at this time may be a character string, be in a binary format or in an XML format, or be according to an expression method such as JSON (JavaScript (registered trademark) Object Notation). The data sequence obtained in this procedure preferably includes information on the degree of influence by one or more predetermined influential factors on the learning result. In this case, it is preferable that, for example, the influence determining portion 145 describes the degree of influence on the tree structure according to output of the influence determination logic, and the identifying information generating portion 146 enumerates the degree of influence as well in the data sequence.

The identifying information generating portion 146 generates identifying information by converting the data sequence according to a predetermined method such as listing (preparing a list), compression, or encryption. The predetermined method is a method in which, if original data sequences at this time are different from each other, different pieces of identifying information are generated.

For example, identifying information generated at this time may be a predetermined character string such as "qijsudi48fuhu" or "nvfsuki3fjn45ip". This character string may be generated at random. In this case, the identifying information generating portion 146 can prevent the same identifying information from being allocated to different learning results, by managing generated character strings and original data sequences in a list. Note that the example of the identifying information is not limited to character strings, and any method can be used that can reduce the amount of information from data sequences.

The identifying information generating portion 146 can generate identifying information, according to a method other than those described above. For example, a program may be created in an object-oriented language, factor information may be defined in classes in a hierarchy structure, and results obtained by marking the instances of the classes may be serialized and registered in a database.

In a learning method using random numbers such as deep learning, as described above, the acquired capability may be slightly different each time learning is performed. In this case, the identifying information generating portion 146 may assign identifying information generated by the above-described method, with information (derivation identifying information) indicating the number of times a learning process has been performed, such as first learning or second learning. Furthermore, if a large number of PCs are used as the learning apparatuses 13, identifying information can be generated by combining names of the PCs used (e.g., "C2145. $33^{-rd}$ learning", etc.).

Note that the identifying information may also have a hierarchy structure according to basic factors and influential factors.

The learning result variations thus generated and provided by the identifying information generating portion 146 may further contain information for identifying a learning result content. That is to say, the identifying information may contain information with which it is possible to determine whether or not a learning result matches a content requested by a requester. For example, the identifying information generating portion 146 can search for information (e.g., an identifier of learning data, an object value of learning, etc.) on the details regarding an individual influential factor, necessary to identify a learning result content, referring to the learning request DB 112, based on the identifying information, and notify the requester of this information together with the identifying information. The requester can identify a learning result content, by taking the notified detailed information into consideration.

4. Use of Learning Result

Next, usage examples of a learning result will be described.

If a learning result is used by the learning result using apparatuses 23, matters such as copying the learning result, transmitting the copy, and a usage state of the learning result are preferably managed. Thus, the following information is preferably stored as a usage history in the learning result usage history DB 113.

User

Apparatus that uses result

Location where result is used

Purpose of use

Object of use

Combination of learning results

Dividing learning result

Usage history

In the learning result usage history DB 113, information related to the use is converted into recordable data and is recorded on the time series plot. At this time, information for identifying a usage history is preferably generated by a method similar to that for the above-described learning result identifying information.

5. Use of Identifying Information

Next, usage examples of learning result identifying information will be described.

If the learning result identifying information is used, a requester can distinguish acquired capability variations from each other. That is to say, learning results can be compared, and the degrees of matching with a purpose can be compared, so that an appropriate variation can be selected for each object.

Furthermore, since the learning results can be identified, a correspondence relationship between an apparatus that uses a learning result and the learning result that is used, a correspondence relationship between a learning result that is used and a target, affiliation of a capability acquired as a learning result, affiliation of a factor that provided a learning result for a copy of the learning result, and the like can be each identified and managed. Furthermore, since the learning results can be identified, a usage history of an acquired capability, a location in which an acquired capability is located, output of an acquired capability, and the like can be managed.

Next, specific examples of identifying information generated in specific use of the present invention and a method for using the same will be described. In the following usage examples, in order to facilitate the understanding, examples will be shown in which the identifying information generating portion 146 does not perform encryption or the like on the above-described data sequence obtained from the influential factor list using the influence determination logic. Also in this case, if an encryption key that is different for each user is used, contents of the identifying information can be prevented from being seen by the others. Furthermore, the following examples can be freely combined.

Usage Example A: Example in which One Influential Factor is Different

Usage Example A-1: Example in which Objects are Different

In the case of the same learning requester and different objects, the learning results are respectively assigned different pieces of learning result identifying information. For example, identifying information such as "object apparatus=SX9100.jdsjhfsd" or "object apparatus=SX9200.djsthsjfk" is assigned.

On the other hand, in case of the same object apparatus and different sensors or the like, identifying information such as "object sensor=group a74.jhsjhuo" or "object sensor=group a90.jsdfhjkg" is assigned (note that this is an example with the same object apparatus SX9100 where the identification range is "SX9100").

Usage Example A-2: Example in which Learning is Performed a Plurality of Times (In which Object Apparatus has to be Identified)

In this case, identifying information such as "object apparatus=SX9100, first learning", "object apparatus=SX9100. second learning", "object apparatus=SX9100. learning end time=20160707123521", or "object apparatus=SX9100. learning end time=20160708114335" is assigned.

Usage Example A-3: Example in which Learning Data is Different

In this case, identifying information such as "object apparatus=SX9100. learning data=000001-019999" or "object apparatus=SX9100. learning data=020000-029999", "object apparatus=SX9100. learning data=April, 2015", "object apparatus=SX9100. learning data=May, 2015" is assigned.

Usage Example A-4: Example in which Learning Programs are Different

In this case, identifying information such as "learning program=DQ2939. object apparatus=SX9100" or "learning program=DQ3200. object apparatus=SX9100" is assigned.

Usage Example A-5: Example in which Requesters are Different

For example, if request departments are different, identifying information such as "object apparatus=SX9100. request department=First Works Sec." or "object apparatus=SX9100. request department=Second Works Sec." is assigned.

Usage Example B: Example in which Plurality of Influential Factors are Different For example, if requesters, objects, and learning data, which are basic factors, are different, identifying information such as "object apparatus=SX9100. request department=First Works Sec. learning data=April, 2015" or "object apparatus=SX9200. request department=First Engineering Sec. learning data=July, 2016" is assigned.

Usage Example C: Example in which Ranges where Identifying Information is Used are Different For example, identifying information in a learning service provider is "learning requester=company A. object apparatus=SX9100. learning program DQ2939. learning data=020000-029999", and the identifying information between different requesters is identified as follows: "learning requester=company B. object apparatus=JQR939400. learning program DQ2939. learning data=July, 2016". In this case, identifying information assigned to users is obtained as the following identifying information by excluding the identifying information related to the learning requester.—Identifying information assigned to learning requester Company A: "object apparatus=SX9100. learning program DQ2939. learning data=020000-029999"—Identifying information assigned to learning requester Company B: "object apparatus=JQR939400. learning program DQ2939. learning data=July, 2016"

6. System Flow

Figure 12:
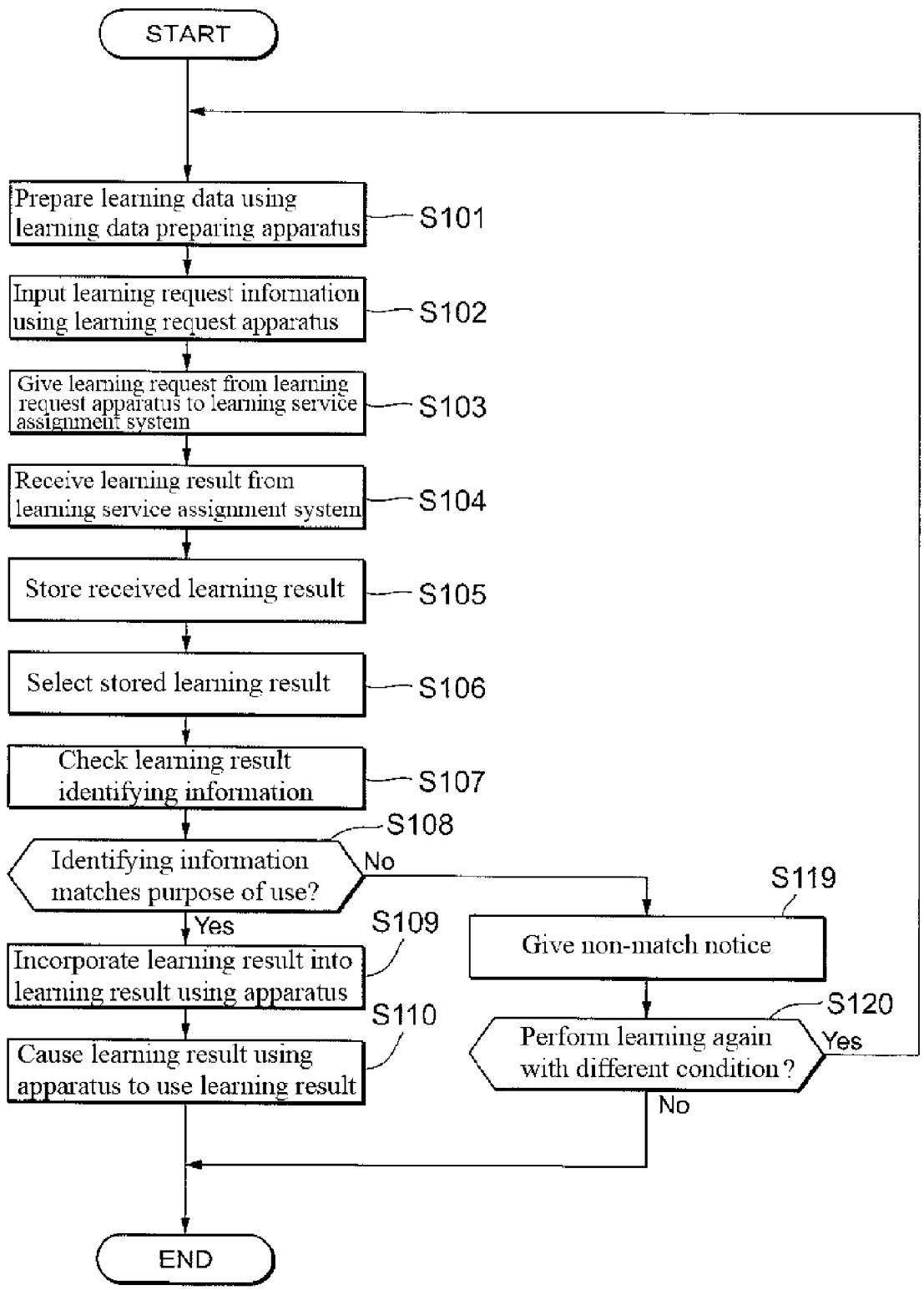
FIG. 12 is a flowchart showing an example of processing of a learning request system.
Figure 13:
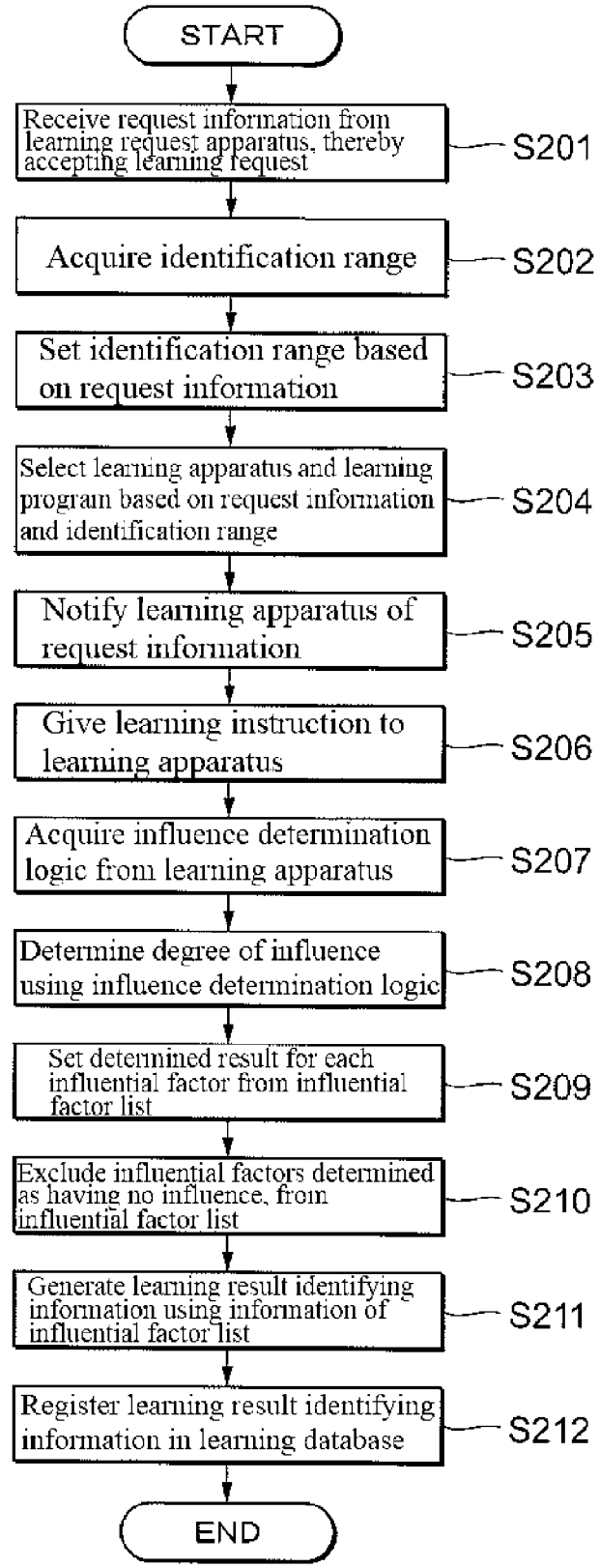
FIG. 13 is a flowchart showing an example of processing of a learning service assignment system.

Next, the processing flow of the system according to this embodiment will be described with reference to FIGS. 12 and 13. FIG. 12 is a flowchart showing the processing flow in the learning request system 2.

First, a requester prepares learning data using the learning data preparing apparatus 21 (S101). Next, the requester inputs learning request information using the learning request apparatus 22 (S102). Then, the requester gives a learning request from the learning request apparatus 22 to the learning service assignment system 1 (S103). If learning is performed in the learning service assignment system 1, the learning request apparatus 22 receives a learning result from the learning service assignment system 1 (S104), and stores the received learning result (S105).

When using a learning result is to be used by the learning result using apparatus 23, the learning request apparatus 22 selects an appropriate learning result from the stored learning results (S106). At this time, the learning request apparatus 22 determines whether or not the selected learning result matches a purpose of use, referring to the learning result identifying information (S108). If the selected learning result matches a purpose of use (S108: Yes), the learning result is incorporated into the learning result using apparatus 23 (S109), and is used by the learning result using apparatus 23 (S110).

On the other hand, if the selected learning result does not match a purpose of use in S108 (S108: No), notice of non-match is given (S119), and, if necessary, learning is performed again with a different condition (S120).

Next, the processing flow of the learning service assignment system 1 will be described. FIG. 13 is a flowchart showing the processing flow in the learning service assignment system 1.

First, the learning request accepting apparatus 12 receives learning request information from the learning request apparatus 22, thereby accepting a learning request (S201). Next, the identification range setting portion 144 of the learning management apparatus 14 acquires information necessary to set an identification range (S202). The identification range setting portion 144 sets an identification range from the acquired information and learning request information (S203).

The learning control portion 142 selects a learning apparatus 13 and a learning program based on the learning request information and the set identification range (S204), notifies the selected learning apparatus 13 of the learning request information (S205), and gives a learning instruction (S206).

The influence determining portion 145 extracts an influential factor list referring to the factor information DB 116. Furthermore, the influence determining portion 145 acquires an influence determination logic corresponding to the learning program from the learning apparatus 13 (S207), and determines the degree of influence by each factor on a learning result, using the acquired influence determination logic (S208). The influence determining portion 145 sets a determined result for each influential factor described in the influential factor list (S209).

Next, the identifying information generating portion 146 excludes influential factors regarded as having no influence, from the influential factor list (S210), and generates learning result identifying information using the influential factor list after the exclusion (S211). The identifying information generating portion 146 registers the generated identifying information and the learning result in association with each other in the version management DB 114 (S212).

In this manner, with the learning service assignment system 1 according to this embodiment, capability variations acquired by machines can be managed as appropriate.

Above, an embodiment of the present invention has been described. The foregoing embodiment is for the purpose of facilitating understanding of the present invention, and is not to be interpreted as limiting the present invention. The invention can be altered and improved without departing from the gist thereof. For example, the steps in the above-described processing flows can be partially omitted, be rearranged in any desired order, or be executed in parallel, as long as doing so does not cause conflict in the processing content.

In the foregoing embodiment, examples were described in which the system according to the present invention is used to manage capabilities acquired by machines according to AI techniques such as deep learning, but the present invention is not limited thereto, and can be applied to a wide variety of fields. Examples thereof include various industrial fields, fishery fields, agricultural fields, forestry fields, service industries, and medical and health fields, such as identification between non-defective products and defective products, foods, machine parts, chemical products, drugs, and the like. Furthermore, the present invention can be applied to cases where AI techniques are applied to products in embedding fields, systems such as social systems using IT techniques, analysis on big data, classifying functions in a wide variety of control apparatuses, and the like.

Note that, in this specification, a "portion" or "means" does not merely mean a physical configuration, and there is also a case where a function of a "portion" is realized by software. Furthermore, a function of one "portion", "piece of means", or apparatus may be realized by two or more physical configurations or apparatuses, and functions of two or more "portions", "pieces of means", or apparatuses may be realized by one physical configuration or apparatus.

(Additional Remark 1)
An identifying information assignment system, including at least one hardware processor,
wherein the hardware processor
generates, for a learning result obtained by attaining a predetermined capability through a predetermined learning process by machine learning, identifying information for identifying the predetermined learning process, and
assigns the generated identifying information to the learning result.

(Additional Remark 2)
An identifying information assignment method, including:
a step of causing at least one or more hardware processors to generate, for a learning result obtained by attaining a predetermined capability through a predetermined learning process by machine learning, identifying information for identifying the predetermined learning process; and
a step of causing the at least one or more hardware processors to assign the generated identifying information to the learning result.

REFERENCE SIGNS LIST

1 Learning service assignment system
2 Learning request system
11 Learning database
12 Learning request accepting apparatus
13 Learning apparatus
14 Learning management apparatus (identifying information assignment system)
21 Learning data preparing apparatus
22 Learning request apparatus
23 Learning result using apparatus
24 Learning data input apparatus
121 Learning request accepting portion
123 Learning data storage portion
124 Learning request content storage portion
125 Communication portion
131 Learning control portion
132 Neural network
133 Learning result extracting portion
134 Communication portion
135 Learning result output portion
141 Learning information acquiring portion
142 Learning control portion (assignment portion)
143 Factor information acquiring portion
144 Identification range setting portion
145 Influence determining portion
146 Identifying information generating portion (generating portion)
147 Communication portion
211 Operating portion
212 Learning data acquiring portion
213 Learning data storage portion
214 Data acquisition control portion
216 Communication portion
221 Learning request portion
222 Learning request content storage portion
223 Learning data storage portion
224 Communication portion
231 Learning result input portion
232 Neural network setting portion
233 Neural network
234 Control portion 235 Input portion
236 Communication portion
237 Data acquiring portion
238 Output portion

The invention claimed is:

1. An identifying information assignment system, comprising: a processor configured with a program to perform operations comprising:
   operation as a learning information acquiring portion configured to acquire learning request information comprising information to perform a machine learning process;
   operation as a learning control portion configured to instruct a learning apparatus to perform the machine learning process, based on the learning request information;
   operation as a factor information acquiring portion configured to acquire, from a factor information database, factors that may have an influence on a learning result obtained by the learning apparatus performing the machine learning process;
   operation as an influence determining portion configured to determine whether or not each factor retrieved from the factor information database has an influence on the learning result, and to determine degrees of influence on the learning result, based on a correspondence relationship between the factors which influence the learning result according to conditions associated with the factors; and
   operation as a generating portion configured to generate identifying information based on the factors determined to influence the learning result by the influence determining portion, wherein
   operation as the learning control portion further comprises assigning the generated identifying information to the learning result.

2. The identifying information assignment system according to claim 1, wherein the processor is configured with the program perform operations such that operation as the generating portion is further configured to:
   generate, for a first learning result obtained by attaining a first capability through performing a first machine learning process, first identifying information for identifying the first machine learning process within a specific identification range; and
   generate, for a second learning result obtained by attaining a second capability through performing a second machine learning process, second identifying information for identifying the second machine learning process such that the first machine learning process and the second machine learning process are distinguished from each other within the specific identification range.

3. The identifying information assignment system according to claim 2, wherein the processor is configured with the program perform operations such that operation as the generating portion is further configured to generate the identifying information based on a factor that has an influence on a learning result within the specific identification range, among conditions that are associated with the first learning process and the second learning process being performed.

4. The identifying information assignment system according to claim 1, wherein learning request information that is identifiable by the identifying information comprises at least one factor selected from among: a learning apparatus; a learning program; learning data; a number of times of learning; a time of learning; an object of learning; a method of learning; a learning requester; an acquisition source of learning data; and an acquisition method of learning data.

5. The identifying information assignment system according to claim 1, wherein the processor is configured with the program perform operations further comprising: operation as a learning apparatus configured to perform the machine learning.

6. The identifying information assignment system according to claim 5, wherein the processor is configured with the program perform operations such that operation as the learning apparatus is further configured to perform the machine learning according to learning request information to perform machine learning of a capability that is to be added to an object apparatus.

7. The identifying information assignment system according to claim 1, wherein the processor is configured with the program perform operations such that operation as the generating portion is further configured to generate the identifying information, by encrypting, compressing, or listing a data sequence enumerating the factors determined to influence the learning result.

8. An identifying information assignment method for causing a computer to perform operations comprising:
   acquiring learning request information comprising information to perform a machine learning process;
   instructing a learning apparatus to perform the machine learning process, based on the learning request information;
   acquiring, from a factor information database, factors that may have an influence on a learning result obtained by the learning apparatus performing the machine learning process;
   determining whether or not each factor retrieved from the factor information database has an influence on the learning result, and degrees of influence on the learning result, based on a correspondence relationship between the factors which influence the learning result according to conditions associated with the factors;
   generating identifying information based on the factors determined to influence the learning result; and
   assigning the generated identifying information to the learning result.

9. A non-transitory computer-readable storage medium storing a program, which when read and executed, causes a computer to perform operations comprising:
   acquiring learning request information comprising information to perform a machine learning process;
   instructing a learning apparatus to perform the machine learning process, based on the learning request information;
   acquiring, from a factor information database, factors that may have an influence on a learning result obtained by the learning apparatus performing the machine learning process;
   determining whether or not each factor retrieved from the factor information database has an influence on the learning result, and degrees of influence on the learning result, based on a correspondence relationship between the factors which influence the learning result according to conditions associated with the factors;
   generating identifying information based on the factors determined to influence the learning result; and
   assigning the generated identifying information to the learning result.

10. The method according to claim 8, further comprising:
   generating, for a first learning result by attaining a first capability through performing a first machine learning process, first identifying information for identifying the first machine learning process within a specific identification range; and generating, for a second learning result obtained by attaining a second capability through performing a second machine learning process, second identifying information for identifying the second machine learning process such that the first machine learning process and the second machine learning process are distinguished from each other within the specific identification range.

11. The method according to claim 10, further comprising generating the identifying information based on a factor that has an influence on a learning result within the specific identification range, among conditions that are associated with the first learning process and the second learning process being performed.

12. The method according to claim 8, wherein learning request information that is identifiable by the identifying information comprises at least one factor selected from among: a learning apparatus; a learning program; learning data; a number of times of learning; a time of learning; an object of learning; a method of learning; a learning requester; an acquisition source of learning data; and an acquisition method of learning data.

13. The method according to claim 8, further comprising performing the machine learning via a learning apparatus.

14. The method according to claim 13, wherein performing the machine learning via the learning apparatus comprises performing the machine learning according to learning request information to perform machine learning of a capability that is to be added to an object apparatus.

15. The method according to claim 8, further comprising generating the identifying information by encrypting, compressing, or listing a data sequence enumerating the factors determined to influence the learning result.

* * * * *